US011661984B2

(12) United States Patent
Henning et al.

(10) Patent No.: US 11,661,984 B2
(45) Date of Patent: May 30, 2023

(54) BRAKE CALIPER FOR A VEHICLE BRAKE

(71) Applicants: Paul Henning, Schwetzingen (DE); Przemyslaw Kowalski, Wrocaw (PL)

(72) Inventors: Paul Henning, Schwetzingen (DE); Przemyslaw Kowalski, Wrocaw (PL)

(73) Assignee: ZF CV SYSTEMS EUROPE BV, Brussels (BE)

( * ) Notice: Subject to any disclaimer, the term of this patent is extended or adjusted under 35 U.S.C. 154(b) by 219 days.

(21) Appl. No.: 16/984,219

(22) Filed: Aug. 4, 2020

(65) Prior Publication Data

US 2021/0040999 A1 Feb. 11, 2021

(30) Foreign Application Priority Data

Aug. 5, 2019 (EP) ..................................... 19189966

(51) Int. Cl.
| | |
|---|---|
| *F16D 55/08* | (2006.01) |
| *F16D 65/00* | (2006.01) |
| *F16D 55/2255* | (2006.01) |
| *F16D 65/18* | (2006.01) |
| *F16D 55/00* | (2006.01) |

(Continued)

(52) U.S. Cl.
CPC ..... *F16D 65/0075* (2013.01); *F16D 55/2255* (2013.01); *F16D 65/0006* (2013.01); *F16D 65/18* (2013.01); *F16D 2055/002* (2013.01); *F16D 2055/0045* (2013.01); *F16D 2125/26* (2013.01); *F16D 2125/28* (2013.01); *F16D 2250/0084* (2013.01)

(58) Field of Classification Search
CPC .. F16D 55/2255; F16D 65/0006; F16D 65/18; F16D 65/568; F16D 2125/26; F16D 2125/28; F16D 2250/0084
See application file for complete search history.

(56) References Cited

U.S. PATENT DOCUMENTS 5,547,048 A 8/1996 Antony
5,833,035 A * 11/1998 Severinsson ............ F16D 65/18
188/71.9

(Continued)

FOREIGN PATENT DOCUMENTS

CN 1326058 A 12/2001
CN 101303054 A 11/2008
(Continued)

*Primary Examiner* — Nicholas J Lane
(74) *Attorney, Agent, or Firm* — Dickinson Wright PLLC

(57) ABSTRACT

A brake caliper (1, 1') for a vehicle brake, in particular a disc brake of a commercial vehicle, includes a pressure piece (110, 110'), a thrust piece (120, 120') configured to move axially relative to the pressure piece (110, 110') in a thrust direction (A) to transmit a braking force and a guiding member (130*a,b*, 130'*a,b*) configured to limit the movement of the thrust piece (120, 120') relative to the pressure piece (110, 110') in at least one direction orthogonal to the thrust direction (A). The brake caliper (1, 1') may further include a lever (140) pivotally supported between the thrust piece (120, 120') and the pressure piece (110, 110'), wherein the guiding member (130*a,b*, 130'*a,b*) is configured to limit the movement of the lever (140) relative to the pressure piece (110, 110') and/or the thrust piece (120, 120') in at least one direction orthogonal to the thrust direction (A).

14 Claims, 10 Drawing Sheets

(51) Int. Cl.
*F16D 125/28* (2012.01)
*F16D 125/26* (2012.01)

(56) References Cited

U.S. PATENT DOCUMENTS

| | | | | |
|---|---|---|---|---|
| 2001/0030090 | A1* | 10/2001 | Thomas | F16D 65/18 188/73.1 |
| 2002/0014374 | A1* | 2/2002 | Ortegren | F16D 65/568 188/72.1 |
| 2002/0017437 | A1 | 2/2002 | Ortegren et al. | |
| 2003/0217898 | A1* | 11/2003 | Antony | F16D 65/183 188/72.9 |
| 2005/0045434 | A1* | 3/2005 | Holl | F16D 65/568 188/72.1 |
| 2005/0211509 | A1* | 9/2005 | Severinsson | F16D 65/183 188/73.1 |
| 2010/0252375 | A1 | 10/2010 | Chen et al. | |
| 2011/0147138 | A1* | 6/2011 | Jungmann | F16D 65/567 188/71.7 |
| 2018/0106307 | A1* | 4/2018 | Jungmann | F16D 65/18 |
| 2020/0408268 | A1* | 12/2020 | Henning | B60T 1/065 |

FOREIGN PATENT DOCUMENTS

| | | |
|---|---|---|
| CN | 101852257 A | 10/2010 |
| CN | 102261404 A | 11/2011 |
| CN | 102308113 A | 1/2012 |
| CN | 103154557 A | 6/2013 |
| CN | 106662179 A | 5/2017 |
| CN | 107110261 A | 8/2017 |
| DE | 4430258 C1 | 1/1996 |
| DE | 202007005313 U1 | 8/2007 |
| DE | 102010011725 A1 | 9/2011 |
| DE | 202015008911 U1 | 2/2016 |
| EP | 3109499 A1 | 12/2016 |
| JP | H1030665 A | 2/1998 |
| WO | 2011101076 A1 | 8/2011 |
| WO | 2018015565 A1 | 1/2018 |

* cited by examiner

BRAKE CALIPER FOR A VEHICLE BRAKE

CROSS-REFERENCE TO RELATED APPLICATIONS

This application claims the benefit and right of priority from previous filed European Patent Application No. EP19189966.5, filed Aug. 5, 2019, the entire content of which is hereby incorporated by reference in its entirety.

FIELD OF THE DISCLOSURE

This disclosure relates to a brake caliper for a vehicle brake. More particularly, this disclosure relates to a brake caliper for a disc brake of a commercial vehicle, the brake caliper including a pressure piece and a thrust piece configured to move axially relative to the pressure piece in a thrust direction to transmit a braking force.

BACKGROUND

Brake calipers for vehicle brakes of the aforementioned type are generally known in the art and typically employed in trucks, buses and bikes. Upon receiving an actuation signal, for example, from a brake pedal in the driver cabin or from an electronic control unit, a braking force is generated by the brake cylinder and transmitted to the brake caliper and the thrust piece. After overcoming an air clearance between brake pedals and a brake disc, a frictional force is then applied by an inner brake pad advanced by the thrust piece to the rotating brake disc of the brake. At the same time, a frictional force is applied by an outer brake pad advanced by the brake caliper to the brake disc.

In known brake calipers, at least the thrust piece and the pressure piece are subsequently arranged inside the brake caliper.

As the accessibility inside the brake caliper is limited, the subsequent arrangement increases the risk of an incorrect installation.

When the pressure piece and the thrust piece are pre-assembled before installing in the brake caliper instead, they are not secured in their position relative to each other. Accordingly, there is still the risk of an incorrect installation In order to transmit the braking force to the braking pads, at least the thrust piece has to be movable inside the brake caliper. It is therefore not rigidly fastened to the brake caliper. Thus, an incorrect installation may result in a separation of the parts inside the brake caliper during assembly, installation, and transportation.

Further, with the parts being movable and not directly mounted to the brake caliper, the parts tend to vibrate during assembly, installation and transportation resulting in noise emission and separation of the parts. Thus, there is a risk that the parts may accidentally disassemble from each other even after installation in the brake caliper.

SUMMARY

In view of the above, it is an object of the present disclosure to provide a brake caliper that overcomes the disadvantages mentioned above as much as possible. In particular, it is an object of the disclosure to provide a simplified assembly and increased safety against accidental disassembly of the brake caliper.

The aforementioned objects are achieved by aspects of a brake caliper disclosed and provided herein. In particular, according to an aspect of the disclosure, a brake caliper is provided that includes a guiding member configured to limit the movement of the thrust piece relative to the pressure piece in at least one direction orthogonal to the thrust direction. By limiting the movement in at least one direction orthogonal to the thrust direction by the guiding member, such limitation sufficiently secures the thrust piece and the pressure piece before installing the components in the brake caliper and, even after installation in a brake caliper, the arrangement is secured and a malfunction of the brake caliper may be avoided. Hence, the time required for assembling, transport, and installation may be reduced, as the repeated inspection of the correct position and alignment is no longer necessary.

A direction orthogonal to the thrust direction in the context of the disclosure is understood to mean a direction that is orthogonal to the direction in which the thrust piece moves relative to the pressure piece in order to transmit a braking force. Thus, the guiding member preferably limits the movement of the thrust piece relative to the pressure piece in a first direction orthogonal to the thrust direction and in a second direction orthogonal to the first direction and to the thrust direction.

Furthermore, if the guiding member is configured to limit the movement of the thrust piece relative to the pressure piece in one direction, the guiding member is preferably, at the same time, also configured to guide the movement of the pressure piece to the thrust piece in the thrust direction.

A person skilled in the art will understand that limiting the movement of the thrust piece relative to the pressure piece can also allow an insignificant relative movement of the thrust piece due to dimensional tolerances that lead to a small clearance between the guiding member and the thrust piece and/or the pressure piece.

In one aspect of the disclosure, the brake caliper further includes a lever pivotally supported between the thrust piece and the pressure piece, wherein the guiding member is configured to limit the movement of the lever relative to the pressure piece and/or the thrust piece in at least one direction orthogonal to the thrust direction. By also limiting the movement of the lever, the assembly of the brake caliper is simplified and an incorrect installation of the lever may be avoided. During the assembly stage, it may be more suitable, due to better accessibility, to collect the pressure piece, the thrust piece and the lever and to limit the movement of said components in at least one direction orthogonal to the thrust direction, in order to provide a brake caliper having an improved functionality and a simplified assembly.

In one aspect, the guiding member and the thrust piece engage in a positive fit and/or in a non-positive fit to limit the movement of the thrust piece relative to the pressure piece. The thrust piece is appropriately secured this way.

A positive fit or a positive connection in the context of the disclosure is understood to mean that two parts engage each other by means of respectively corresponding (incl. mating) geometrical form. In contrast, a non-positive fit in the context of the disclosure means that the connection between at least two parts relates on contact force, such as a frictional and/or gravitational force.

In one aspect, the guiding member and the pressure piece are engaged in a positive fit and/or in a non-positive fit to limit the movement of the thrust piece relative to the pressure piece in at least one direction orthogonal to the thrust direction.

In one aspect, the brake caliper further includes a pivot bearing having a bearing housing, wherein the pivot bearing is configured to pivotally support the lever against the thrust piece, and wherein the guiding member is configured to engage the bearing housing in a positive fit and/or in a non-positive fit. As the lever is transmitting the forces generated by the brake cylinder, the bearing for the lever has to be positioned accurately all the time, relative to the thrust piece. However, if the pivot bearing is not installed in the correct position and alignment of the bearing components, a malfunction or failure of the brake may occur later. Therefore, during assembly, installation, and transportation, large caution and extensive safety measures must be taken to prevent or substantially limit the components from accidentally separating from each other. Thus, engaging the bearing housing provides a sufficient securement, thereby avoiding separate fixation parts for securing the bearing.

In a further aspect, the brake caliper further includes a rolling member configured to pivotally support the lever against the pressure piece, wherein the guiding member is configured to engage the rolling member in a positive fit and/or in a non-positive fit. Thus, by engaging the rolling member in a positive fit and/or in a non-positive fit, the assembly of such a brake caliper is further simplified and the risk of malfunction or failure of the brake due to an incorrect installation of the rolling member is reduced.

In one aspect, the thrust piece has a first lateral side and a second lateral side, and the guiding member is arranged at the first lateral side of the thrust piece. The disclosure advantageously recognizes that, by arranging the guiding member at the first lateral side, a good accessibility of the guiding member is provided and, furthermore, the components of the brake caliper that are engaged with the guiding member are aligned, and their movement in a direction orthogonal to the thrust direction, namely in the direction extending from the second lateral side to the first lateral side of the thrust piece, is avoided.

In one aspect of the disclosure, the guiding member is a first guiding member that is arranged on the first lateral side, and the brake caliper further includes a second guiding member that is arranged on the second lateral side of the thrust piece. In one aspect, the second guiding member may be parallel to the first guiding member. By providing a first and a second guiding member, evenly arranged at the first and the second lateral sides of the thrust piece, a limitation of the movements of the components of the brake caliper in the direction of the first and second lateral side is sufficiently provided.

Further, by arranging the first and the second guiding members parallel to each other, the first and second guiding members provide a guidance during assembly for the pressure piece and/or the lever and/or the rolling member relative to the thrust piece. Thus, the positioning of the parts installed in the brake caliper to each other is simplified.

In one aspect, the guiding member has at least one preload finger configured to engage the thrust piece such that the movement of the thrust piece relative to the pressure piece in the thrust direction is limited at least in a pre-assembled state of the brake caliper, and wherein the preload finger is configured to yield in response to a braking force transmitted by the thrust piece. Because the guiding member has at least one preload finger configured to engage the thrust piece, such that the movement of the thrust piece relative to the pressure piece in the thrust direction is limited, the disclosure advantageously recognizes that, by also limiting the movement in the thrust direction, the assembly is further simplified. Because the preload finger is configured to yield upon a braking force transmitted by the thrust piece, the guiding member provides sufficient safety during assembling without interfering with correct operation of servicing of the brake.

In the context of the present disclosure, a pre-assembled state of the brake caliper defines a state in which at least the thrust piece and the pressure piece, as well as the guiding member and, in some aspects, also the lever, and/or the rolling member, and/or the bearing, are collected to a pre-assembly, before this pre-assembly is installed in the brake caliper. Thus, the movement of the pre-assembly is secured by the guiding member, as the guiding member is configured to limit the movement of the thrust piece relative to the pressure piece.

In one aspect, the guiding member is integrally formed at the thrust piece. Thus, the function of the guiding member is advantageously integrated in the thrust piece commonly used in a brake caliper of a commercial vehicle. By integrating the function of the guiding member, the plurality of parts to be assembled is reduced and thus the assembly is simplified providing a reduction of costs.

In one aspect, the guiding member has a guiding groove, the guiding groove being configured to limit the movement of the thrust piece relative to the pressure piece in the first direction and in the second direction orthogonal to the thrust direction. By providing a guiding groove, the disclosure advantageously recognizes that such groove can limit the movement of the thrust piece relative to the pressure piece in a first direction and in a second direction orthogonal to the thrust direction, providing an increased securement of the pre-assembly and thus reducing the risk of a malfunction or failure of the brake caliper due to an incorrect assembly. Further, the assembly is simplified, as any movement is prevented in the first direction and in the second direction such that an operator only has to secure the movement in the thrust direction.

However, the movement of the thrust piece relative to the pressure piece in the thrust direction can additionally be limited by said guiding member.

In one aspect, the guiding groove is configured to engage at least one of: the pressure piece, the pivot bearing, the lever, or the rolling member in at least one of a positive fit or a non-positive fit. Thus, the pressure piece, and/or the pivot bearing, and/or the rolling member are at least guided in the thrust direction during assembly and secured during operation by the guiding groove, such that the pre-assembly is secured during assembly, transportation, and operation.

According to another aspect of the disclosure, which is also a separate second embodiment of the disclosure, the disclosure achieves the initially mentioned object by providing a brake caliper that further includes a mounting bracket disposed adjacent to the thrust piece coupling the thrust piece to the brake caliper, and at least one spring element disposed between the bracket and the thrust piece, wherein the thrust piece is configured to urge the thrust piece towards the pressure piece in the thrust direction.

The benefits and aspects of the brake caliper according to the first embodiment of the present disclosure as described above are also aspects and benefits of the brake caliper according to the second embodiment, and vice versa.

By urging the thrust piece towards the pressure piece, the brake caliper is secured against vibration during installation, transportation, and operation of the brake caliper, by applying a retention force acting in an opposite direction as the braking force.

In one aspect, the thrust piece has a number of spring seats that corresponds to the number of spring elements, wherein each spring seat is configured to receive and guide the corresponding spring element. Thus, the thrust piece and the bracket are operatively coupled by means of the spring elements urging the thrust piece towards the pressure piece to avoid a vibration of the parts disposed between the pressure piece and the thrust piece as, for example, the pivot bearing, the lever, or the rolling member.

In a third embodiment, the disclosure also relates to a method for assembling a brake caliper, in particular to a brake caliper according to any of the various aspects of the disclosure and according to the first and second embodiments described above.

In one aspect, the method includes pre-assembling a pressure piece, a thrust piece, and a guiding member, wherein the thrust piece is configured to move axially relative to the pressure piece in a thrust direction to transmit a braking force, and wherein the guiding member is configured to limit the movement of the thrust piece relative to the pressure piece in at least one direction orthogonal to the thrust direction.

The method further includes installing the pre-assembly comprising the thrust piece, the pressure piece, and the guiding member to the brake caliper.

The disclosure according to the third embodiment may incorporate the advantages described above by providing a method for assembling a brake caliper according to one or both of the first and second embodiments.

The examples, benefits, and aspects of the brake caliper of the first and second embodiments described above are also examples, benefits, and aspects of the method of the third embodiment, and vice versa.

For a more complete understanding of the disclosure, the disclosure will now be described in detail with reference to the accompanying drawings. The detailed description will illustrate and describe what is considered as one aspect of the invention. It should of course be understood that various modifications and changes in form or detail could readily be made without departing from the spirit of the disclosure. It is therefore intended that the disclosure may not be limited to the exact form and detail shown and described herein, nor to anything less than the whole of the disclosure disclosed herein and as claimed hereinafter. Further, the features described in the description, the drawings, and the claims may be essential for the invention considered alone or in combination. In particular, any reference signs in the claims shall not be construed as limiting the scope of the claims. The wording "comprising" does not exclude other elements or steps. The wording "a" or "an" does not exclude a plurality.

BRIEF DESCRIPTION OF THE DRAWINGS

Selected exemplary aspects of the invention are explained below with the aid of the accompanying figures, in which.

DETAILED DESCRIPTION OF THE DRAWINGS

Figure 1:
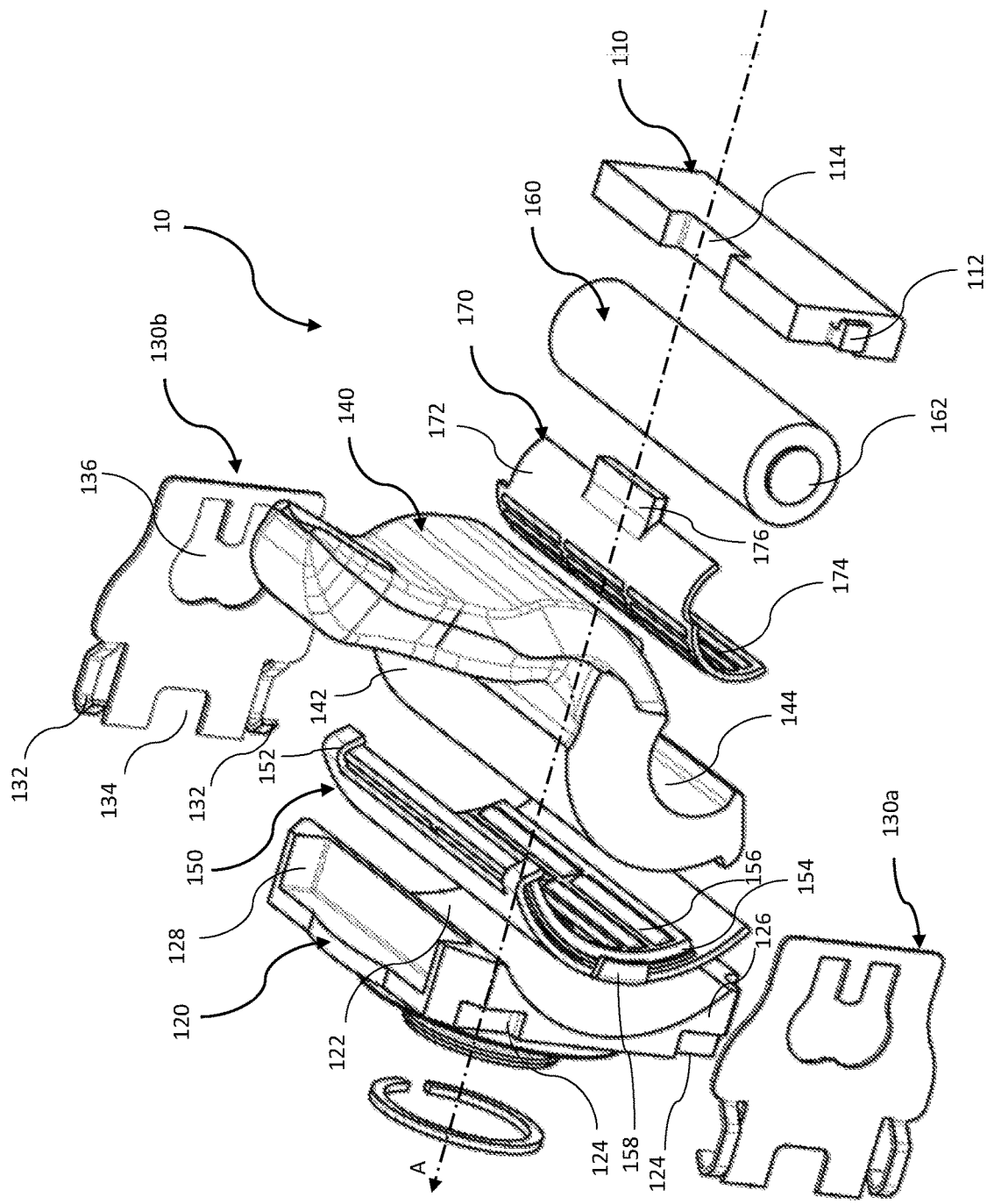
FIG. 1 shows a pre-assembly for a brake caliper in an exploded view according to aspect of the disclosure.
Figure 2:
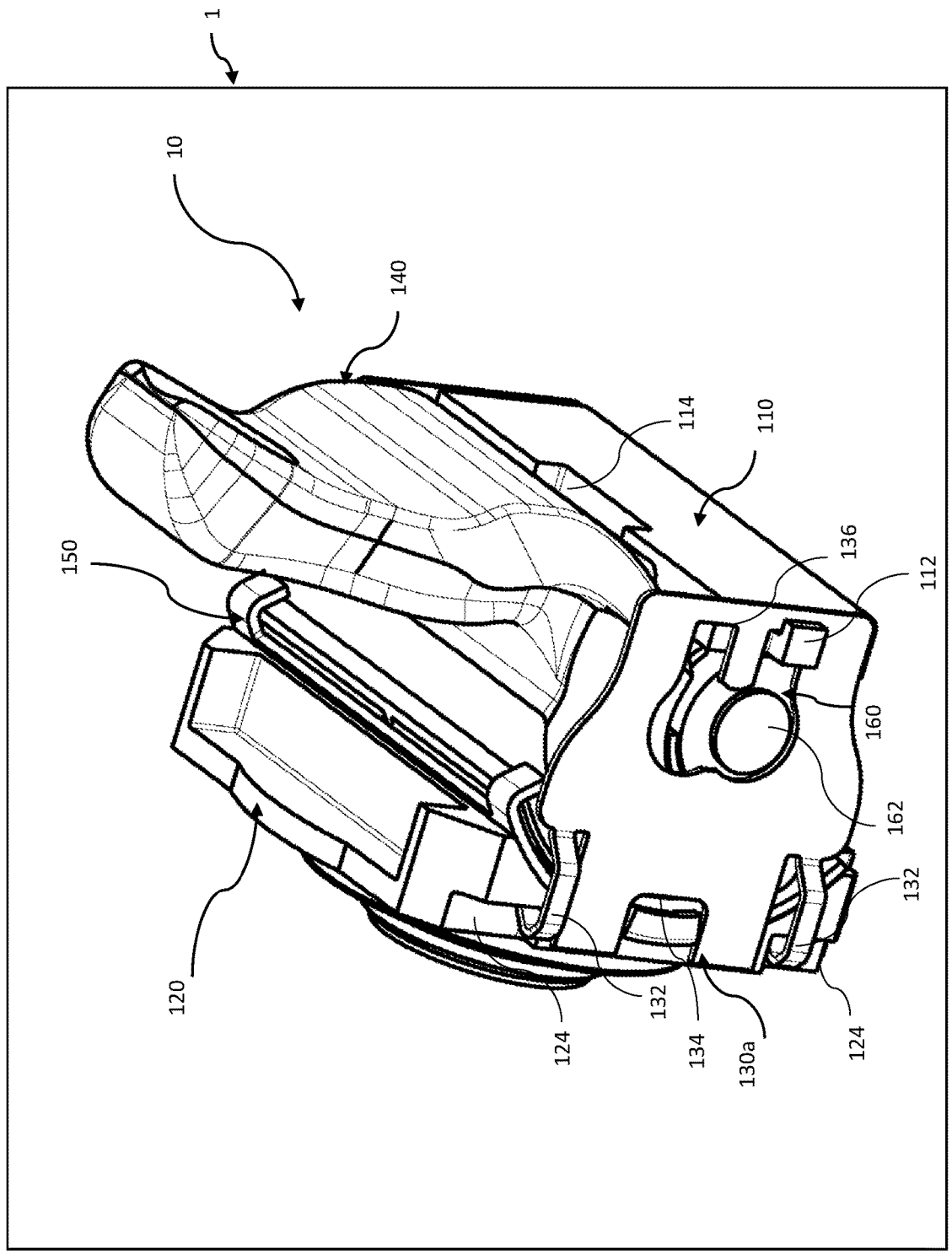
FIG. 2 shows the pre-assembly of FIG. 1 in a perspective view according to an aspect of the disclosure.
Figure 3:
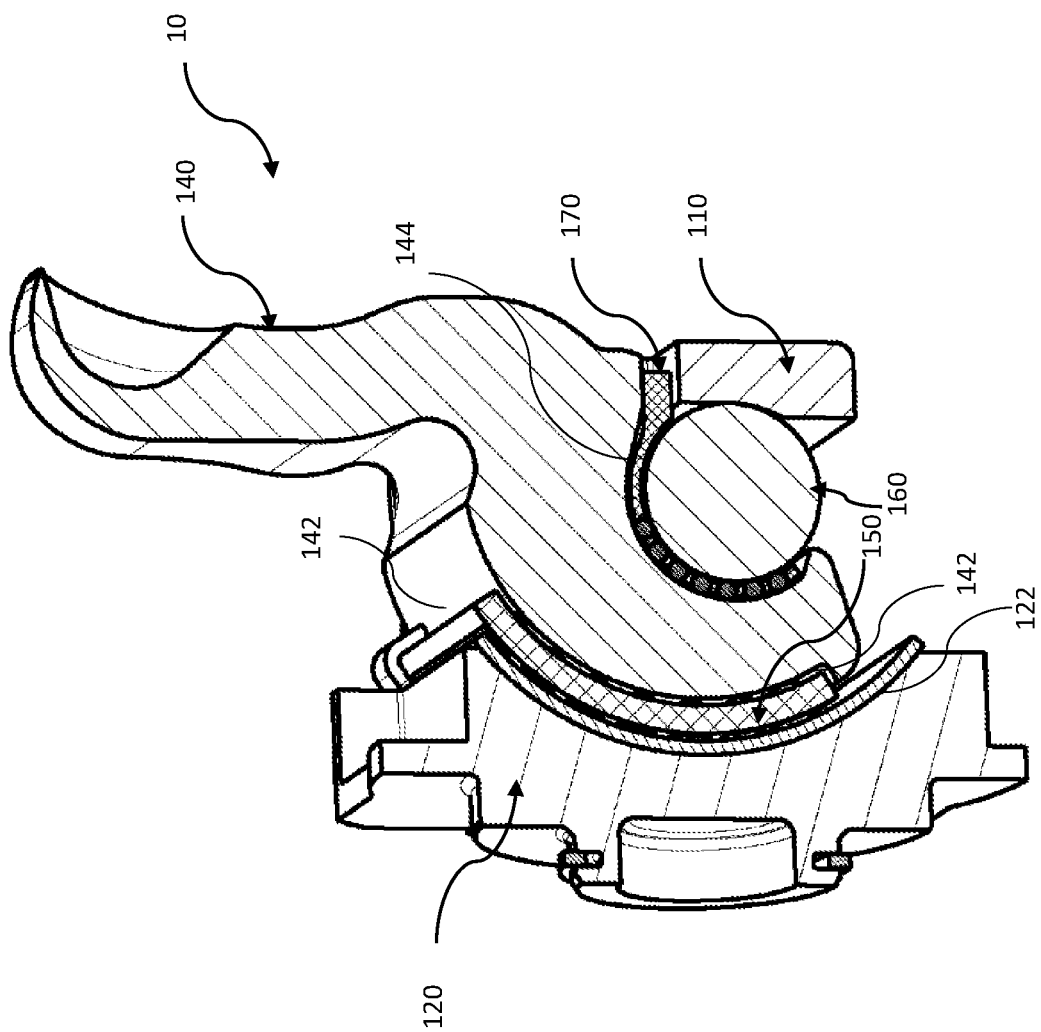
FIG. 3 shows the pre-assembly of FIG. 1 in a sectional view according to an aspect of the disclosure.

FIGS. 1 to 3 illustrate a pre-assembly 10 to be installed in a brake caliper 1. The pre-assembly 10 includes a pressure piece 110 and a thrust piece 120, wherein the thrust piece 120 is configured to move axially relative to the pressure piece 110 in a thrust direction A to transmit a braking force. The pre-assembly 10 further comprises a guiding member 130a, 130b configured to limit the movement of the thrust piece 120 relative to the pressure piece 110 in at least one direction orthogonal to the thrust direction A.

The pre-assembly 10 further comprises a lever 140 pivotally supported against the thrust piece 120 by means of a first pivot bearing 150. The lever 140 is pivotally supported along its rotational axis by a rolling member 160. Furthermore, the pre-assembly 10 has a second pivot bearing 170 configured to axially support the lever 140 against the rolling member 160.

The pressure piece 110 comprises a number of mounting members 112 disposed at a first and second lateral side of the pressure piece 110 and a recess 114 formed between the first and the second lateral side. The number of mounting members 112 is configured to be engaged with a corresponding number of guiding members 130a, b.

The thrust piece 120 comprises a support surface 122 being at least partially cylindrically in correspondence to the first pivot bearing 150, such that the support surface 122 and the pivot bearing 150 are in contact with each other.

The thrust piece 120 further comprises a mounting-interface 124 configured to be engaged with the guiding member 130a, 130b and a first lateral side 126 and a second lateral side 128. The cylindrically shaped support surface 122 is formed along an axis extending from the first lateral side 126 to the second lateral side 128.

The guiding members 130a, b each have two preload fingers 132 configured to engage the corresponding mounting-interfaces 124 provided at the thrust piece 120. The guiding members 130a, b each further comprise a first mounting-interface 134 configured to engage the first pivot bearing 150 at least in a positive fit. The guiding member 130 further comprises a second mounting-interface 136 configured to engage the rolling member 160 and the mounting member 112 provided at the first and second lateral side of the pressure piece 110.

The guiding member 130a is a first guiding member disposed at the first lateral side 126 of the thrust piece 120. The pre-assembly 10 further comprises a second guiding member 130b disposed at the second lateral side 128 of the thrust piece 120.

The guiding members 130a, 130b have a platen form, wherein the first and second guiding member extend parallel to each other in one aspect.

The lever 140 comprises a first bearing surface 142 configured to be in contact with the first bearing 150 and a second bearing surface 144 configured to be in contact with the second pivot bearing 170.

The pivoting movement of the lever 140 advances the thrust piece 120 towards a brake disc (not shown). The lever 140 can be operatively coupled to a brake cylinder (not shown), wherein a braking force is applied on the lever 140 by the brake cylinder.

The first pivot bearing 150 comprises a bearing housing 152 forming the backside of the pivot bearing 150 being in contact with the support surface 122 of the thrust piece 120. The bearing housing 152 is coupled to a bearing cage 154 has a number of rolling elements 156 configured to pivotally support the lever 140. The pivot bearing 150 further comprises a mounting member 158 configured to be engaged with the guiding members 130a, 130b at least in a positive fit.

The rolling member 160 is cylindrically formed, wherein the axial direction of the rolling member 160 is orthogonal to the thrust direction A and the rolling member 160 extends from the first lateral side 126 to the second lateral side 128 of the thrust piece 120. The length of the rolling member 160 generally corresponds to the distance between the first lateral side 126 and the second lateral side 128 of the thrust piece 120. The rolling member 160 comprises two noses 162 arranged at its first lateral side and at its second lateral side, wherein the noses 162 are configured to engage the corresponding second mounting-interface 136 provided at the guiding members 130a, 130b.

The second pivot bearing 170 comprises a bearing cage 172 and a number of rolling elements 174 rotatable coupled to the bearing cage 172. The rolling elements 174 are configured to pivotally support the lever 140 against the rolling member 160. The second pivot bearing 170 further comprises a mounting member 176 configured to be engaged with a corresponding recess 114 provided at the pressure piece 110.

As shown in the sectional view of FIG. 3, the rotation axis of the first pivot bearing 150 is axially offset from the rotation axis of the second pivot bearing 170. Thus, when a braking force is acting on the lever 140, the lever will rotate around the rolling member 160 and due to the axial offset between pivot bearings 150, 170, the rotation of the lever 140 advances the thrust piece 120 in the thrust direction A towards the braking pads.

Figure 4B:
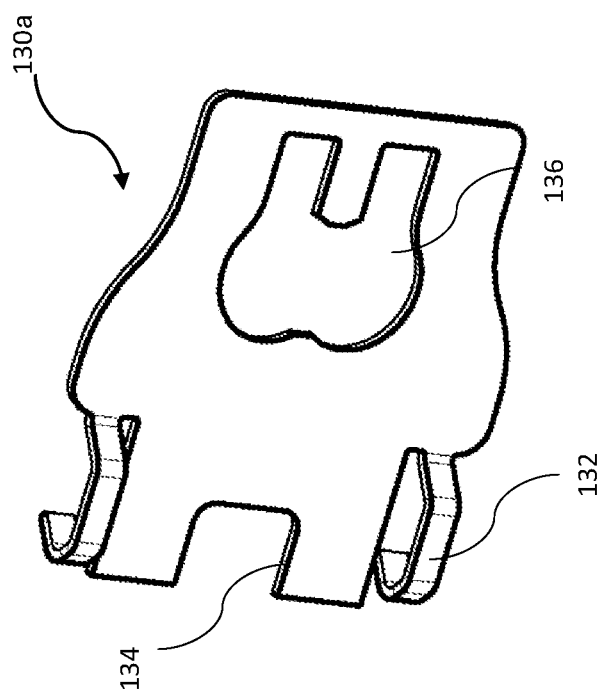
FIG. 4b shows the guiding member for a brake caliper in a second perspective view according to an aspect of the disclosure.
Figure 4A:
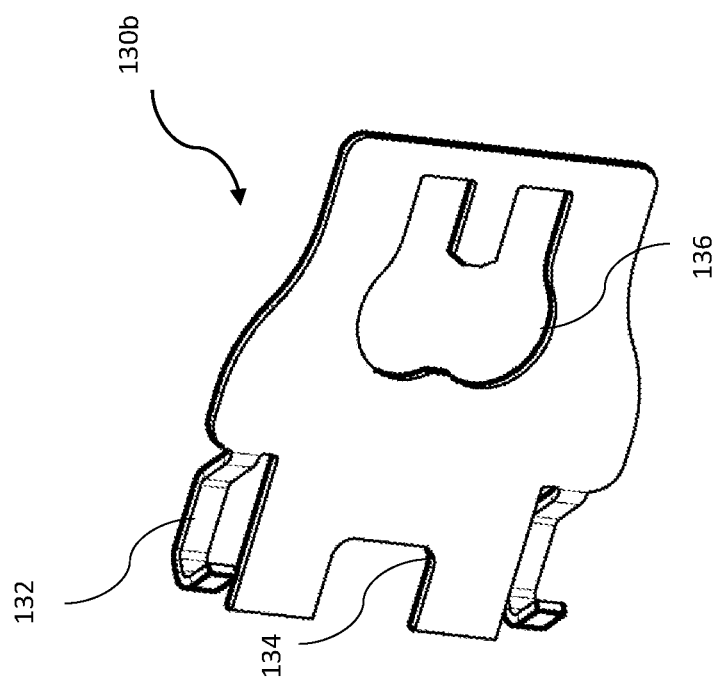
FIG. 4a shows a guiding member for a brake caliper in a perspective view according to an aspect of the disclosure.

FIGS. 4a and 4b show the guiding members 130a, b of the pre-assembly 10 according to one aspect. The guiding members 130a, b each include two preload fingers 132 configured to engage the corresponding mounting-interfaces 124 provided at the thrust piece 120. The preload fingers 132 are formed evenly at a distance to each other and adapted to yield upon a braking force transmitted by the thrust piece 120. Thus, when a braking force is acting on the brake caliper, the movement of the thrust piece 120 relative to the pressure piece 110 in the thrust direction A is no longer limited by the preload fingers 132.

The guiding members 130a, b further comprise a first mounting-interface 134 being formed as a recess that corresponds to the form of the mounting member 158 of the pivot bearing 150. The first mounting-interface 134 is configured to engage the mounting element 158 formed at the bearing housing 152 such that a rotation of the bearing housing 152 around its rotational axis is limited. The guiding member 130 further comprises a second mounting-interface 136 configured to engage the nose 162 of the rolling member 160 by a portion of the second mounting-interface that has an at least partly circular shape that corresponds to the form of the nose 162, and the second mounting-interface 136 is further configured to engage the pressure piece 110 and in particular the mounting element 112 provided at the first and second lateral sides of the pressure piece 110 by a portion of the second mounting-interface 136 that has a rectangular shape corresponding to the shape of the mounting elements 112. Preferably, as shown, the second mounting interface 136 comprises a symmetrical bi-rectangular shape such that the exact same guiding member 130a,b can be used on both lateral sides of the caliper simply by turning the guiding member around by 180° correspondingly.

Figure 5:
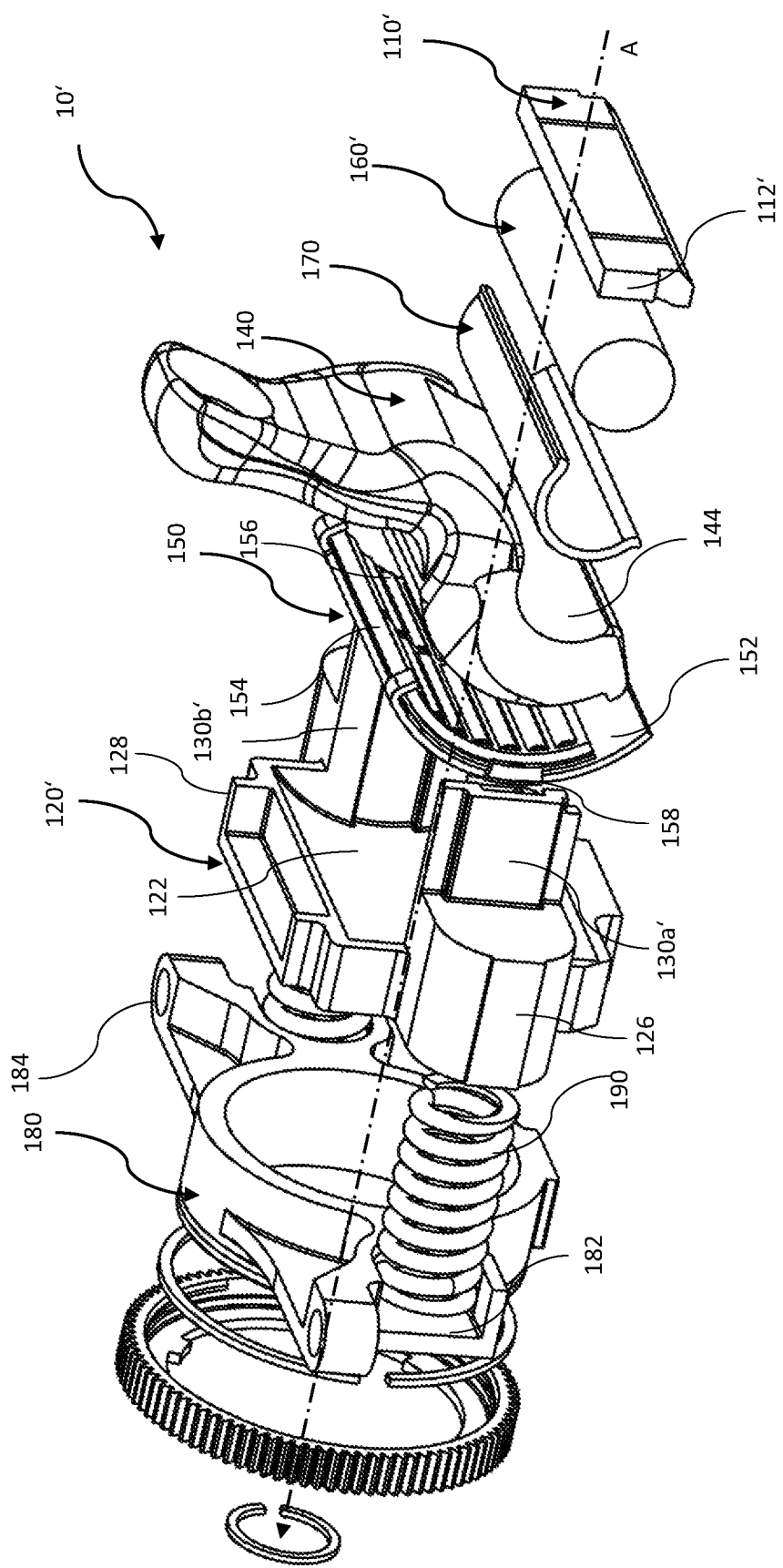
FIG. 5 shows a pre-assembly for a brake caliper in an exploded view according to another aspect of the disclosure.
Figure 6:
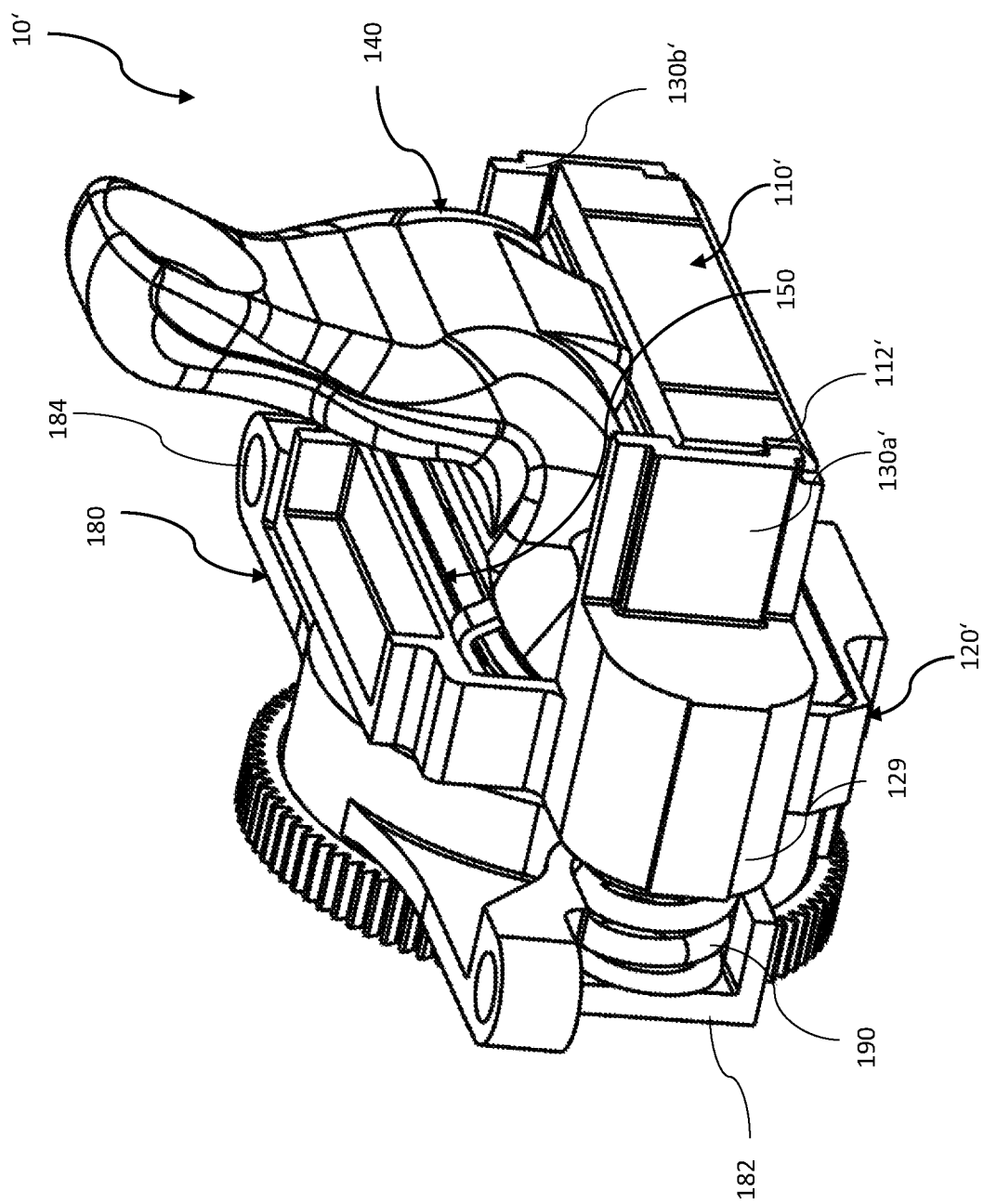
FIG. 6 shows the pre-assembly of FIG. 5 in a first perspective view according to an aspect of the disclosure.
Figure 7:
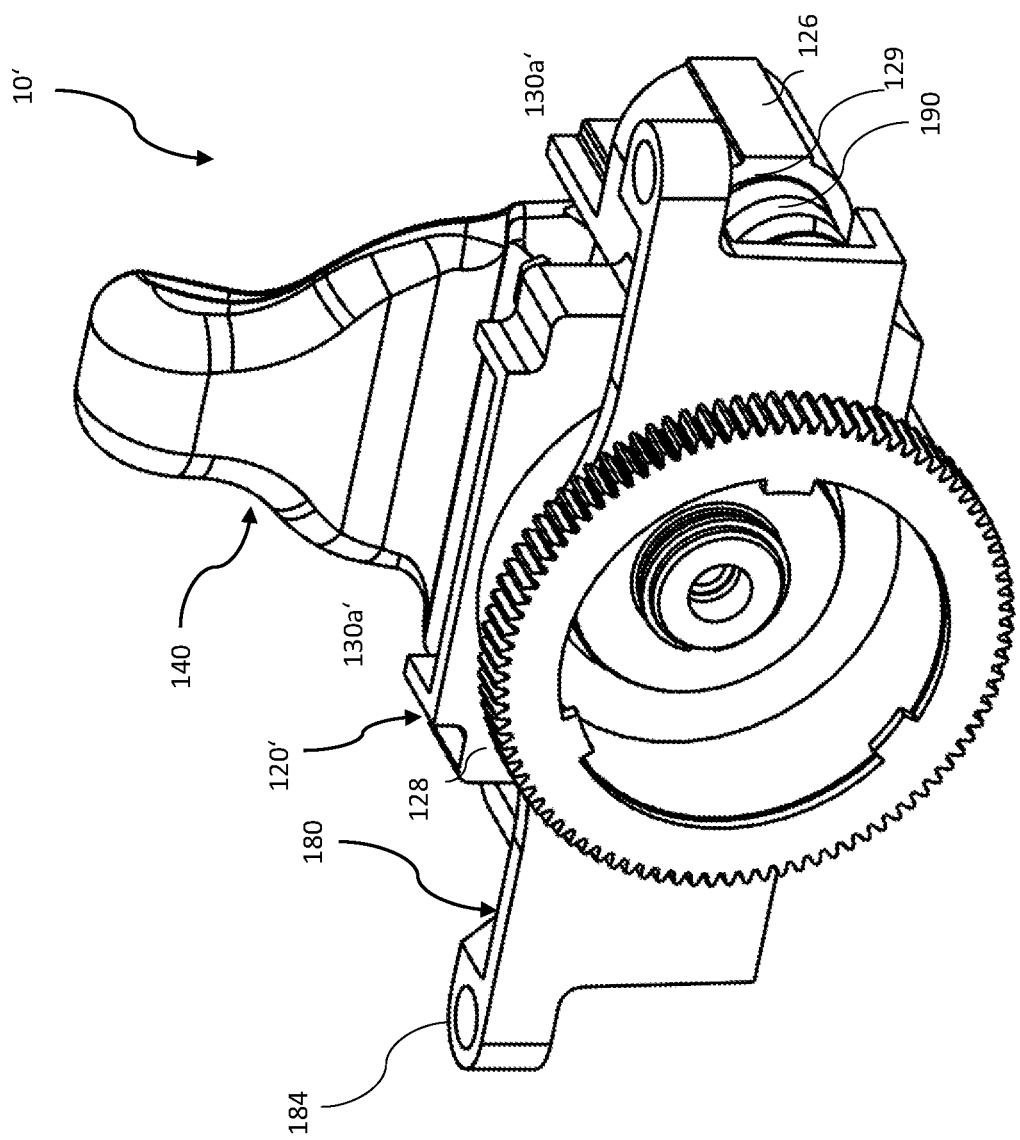
FIG. 7 shows the pre-assembly of FIG. 5 in a second perspective view according to an aspect of the disclosure.

FIGS. 5 to 7 show a pre-assembly 10' for a brake caliper according to a second embodiment.

The pre-assembly 10' comprises a pressure piece 110' and a thrust piece 120', wherein the thrust piece 120' is configured to move axially relative to the pressure piece 110' in a thrust direction A to transmit a braking force. The pre-assembly 10' further comprises guiding members 130a', b' configured to limit the movement of the thrust piece 120' relative to the pressure piece 110' in at least one direction orthogonal to the thrust direction A. According to this aspect, guiding members 130a', b' are configured to limit the movement of the thrust piece 120' relative to the pressure piece 110' in a first and in a second direction orthogonal to the thrust direction A.

The pre-assembly 10' further includes lever 140 pivotally supported against the thrust piece 120' by means of pivot bearing 150. The lever 140 is supported along its rotation axis against a rolling member 160' by means of second pivot bearing 170. For coupling the pre-assembly 10' to the brake caliper, the pre-assembly 10' comprises a mounting bracket 180 operatively coupled to the thrust piece 120' by means of two spring elements 190 applying a retention force on the thrust piece 120' in the thrust direction A towards the pressure piece 110'.

The pressure piece 110' includes mounting members 112' on opposite lateral sides configured to be engaged with the guiding members 130a', b'.

The thrust piece 120' comprises a support surface 122 having an at least partly cylindrical shape that corresponds to the form of the first pivot bearing 150. The thrust piece 120' further comprises a first lateral side 126 and a second lateral side 128. A spring seat 129 is disposed at each of the first and second lateral sides 126, 128 to receive the spring element 190 at least partly.

The guiding member 130a' is a first guiding member 130a' disposed at the first lateral side 126 of the thrust piece 120'. The pre-assembly 10' further includes second guiding member 13b' disposed at the second lateral side 128. The thrust piece 120' and the first and second guiding members 130a, b' are formed as one integral part configured to move axially relative to the pressure piece 110' in the thrust direction A to transmit the braking force and also to limit the movement of the thrust piece 120' relative to the pressure piece 110' in the direction extending from the first lateral side 126 to the second lateral side 128 of the thrust piece 120'.

The lever 140 comprises a first bearing surface 142 configured to be in contact with the first pivot bearing 150 and a second bearing surface 144 configured to be in contact with the second pivot bearing 170.

The first pivot bearing 150 includes a bearing housing 152 forming the backside of the pivot bearing 150 and being in contact with the support surface 122 of the thrust piece 120'. The bearing housing 152 is coupled to a bearing cage 154 having a number of rolling elements 156 configured to pivotally support the lever 140. The pivot bearing 150 further includes mounting member 158 configured to be engaged with the guiding member 130a', b' at least in a positive fit.

The rolling member 160' is cylindrically formed and configured to pivotally support the lever 140 against the pressure piece 110'.

The second pivot bearing 170 includes a bearing cage 172 and a number of rolling elements 174 rotatable coupled to the bearing cage 172. The rolling elements 174 are configured to pivotally support the lever 140 against the rolling member 160'. The second pivot bearing 170 may further include mounting member 176 configured to be engaged with corresponding recess 114 provided at the pressure piece 110', such that a rotation of the bearing cage 172 around its rotation axis is avoided.

The mounting bracket 180 includes a number of spring seats 182 configured to receive the spring elements 190 at least partly and the mounting bracket 180 further includes two mounting interfaces 184 configured to receive fixing devices, for example a screw, to couple the pre-assembly 10' to the brake caliper.

Figure 8:
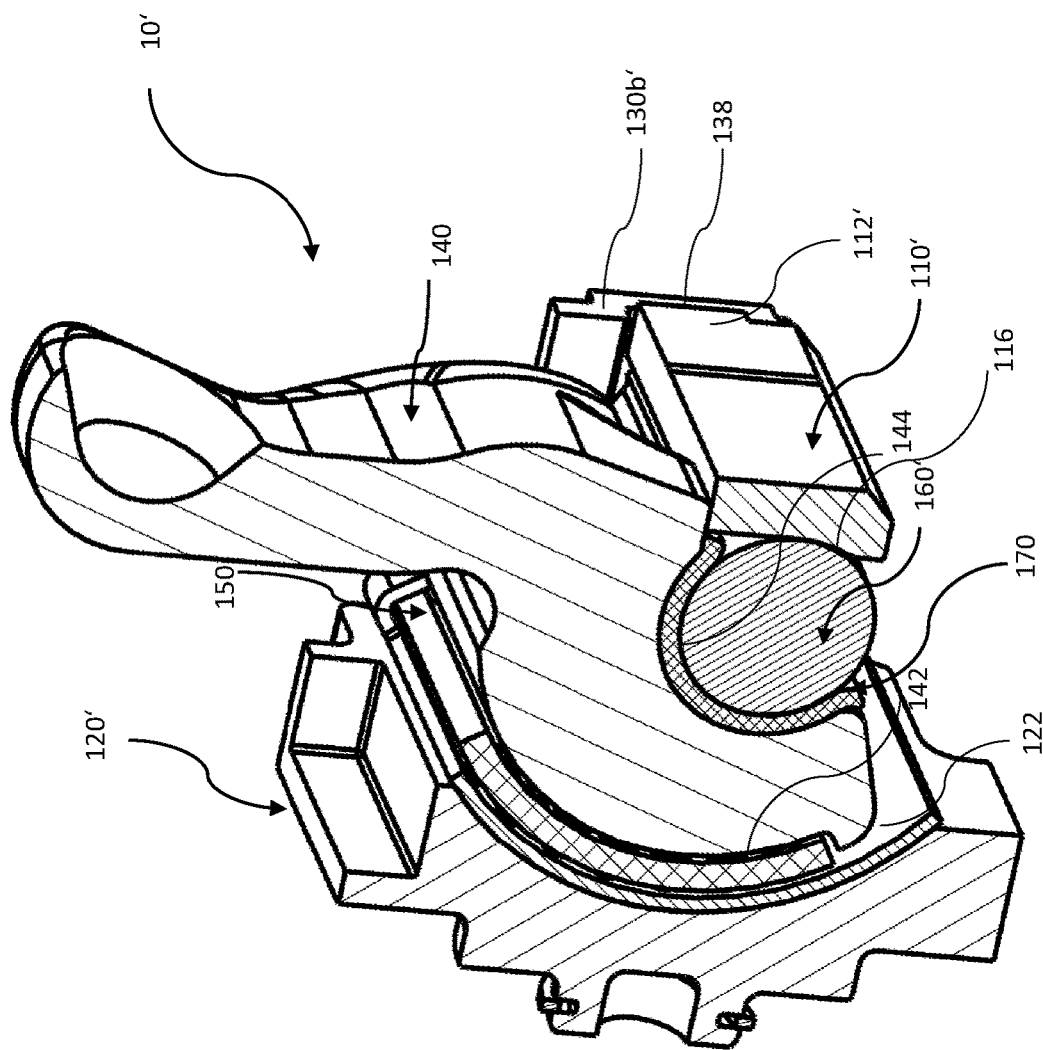
FIG. 8 shows the pre-assembly of FIG. 5 in a sectional view according to an aspect of the disclosure.

As shown in FIG. 8, the lower part 116 of the thrust piece 110' mates with the rolling element 160', such that the rolling element 160' is supported against gravitation forces.

The guiding members 130a' and 130b' have a guiding groove 138 being engaged with the mounting member 112' at least in a positive fit. The guiding members 130a', 130b' are configured to limit the movement of the housing 152 of the first pivot bearing 150 and the movement of the pressure piece 110' in a first and in a second direction orthogonal to the thrust direction A.

Figure 9:
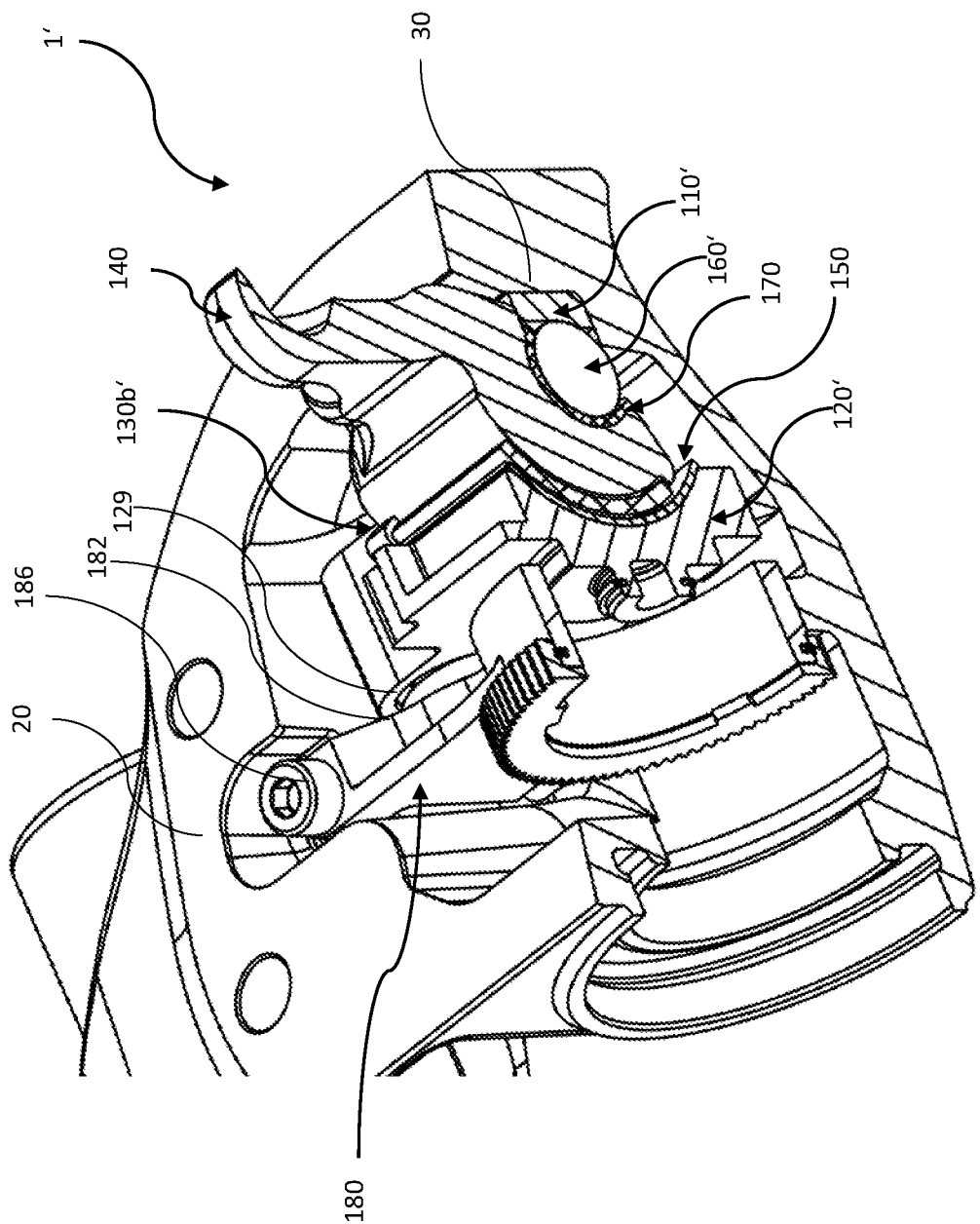
FIG. 9 shows the brake caliper of FIG. 5 in a perspective sectional view according to an aspect of the disclosure.

FIG. 9 shows the brake caliper 1' according to the second embodiment.

The brake caliper 1' further comprises a brake caliper housing 20 configured to receive the pre-assembly 10' and a seat surface 30 configured to support the pressure piece 110' at least in the thrust direction A.

The mounting bracket 180 is coupled to the caliper housing 20 by way of fixing elements 186. The fixing elements 186 are engaged with the corresponding mounting-interface formed as a bore 184 of the mounting bracket 180 and a corresponding threaded bore in the brake caliper housing 20.

Figure 10B:
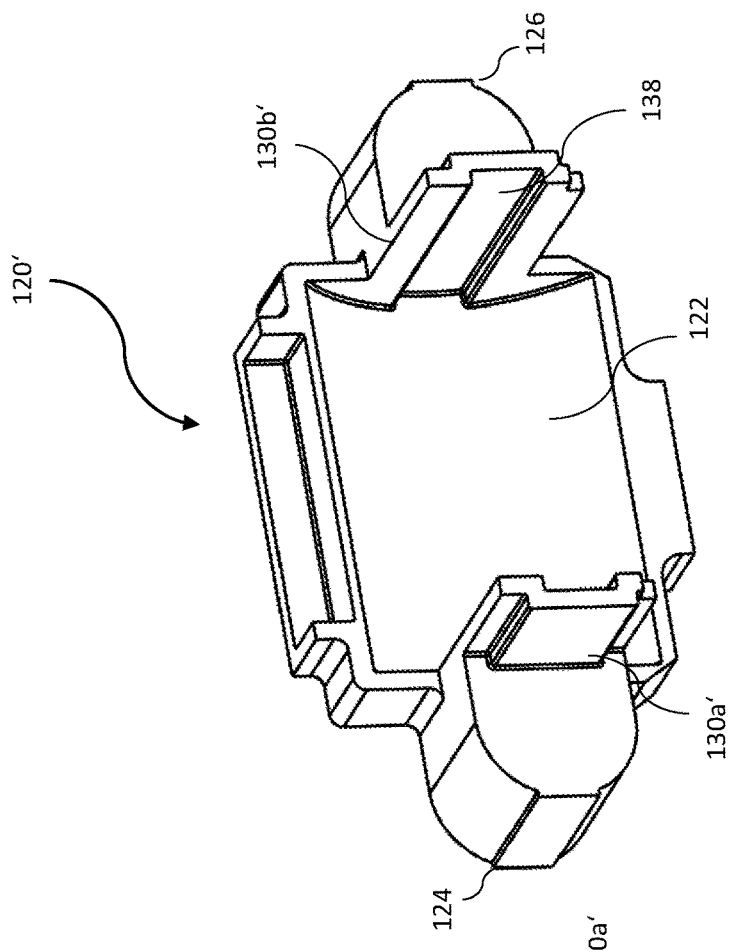
FIG. 10b shows a thrust piece and a guiding member being integrally formed for a pre-assembly of FIG. 5 in a second perspective view according to an aspect of the disclosure.
Figure 10A:
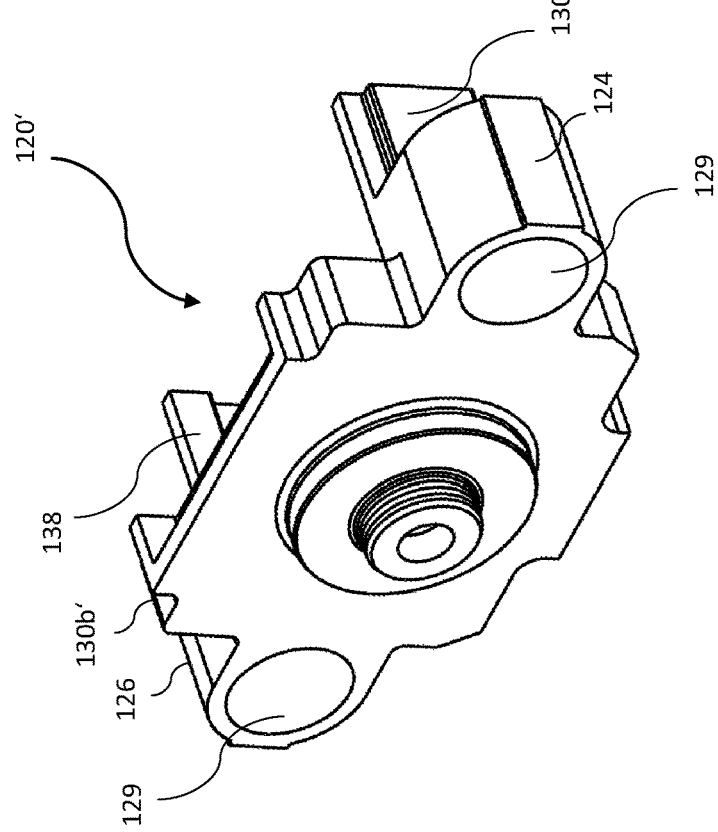
FIG. 10a shows a thrust piece and a guiding member being integrally formed for a pre-assembly of FIG. 5 in a first perspective view according to an aspect of the disclosure.

FIGS. 10a and 10b show the thrust piece 120' and the first and second guiding members 130a', 130b' formed as one integral part. The first and second guiding members 130a', 130b' are disposed at the first and second lateral sides of the thrust piece 120' and extend parallel to each other in the thrust direction. Each guiding member 130a', 130b' has a guiding groove 138 at the inner surface of each guiding member 130a', 130b', wherein the inner surfaces are facing each other. The guiding groove 138 has a rectangular form extending in the thrust direction A. The guiding groove 138 is configured to limit the movement of the housing 152 of the first pivot bearing 150 and the movement of the pressure piece 110' in a first and in a second direction orthogonal to the thrust direction A.

The spring seats 129 are formed as a cylindrical recess, wherein one spring seat is disposed at the first lateral side 126 and a second spring seat 129 is disposed at the second lateral side 128. Each spring seat 129 is configured to receive the spring element 190 at least partly and to guide the spring element 190 during extending and collapsing due to braking forces acting on the thrust piece 120'.

The spring element 190 is configured to apply a retention force on the thrust piece 120' advancing the thrust piece 120' in the thrust direction towards the pressure piece 110'. Thus, a retention force is applied on the whole pre-assembly 10' reducing the vibration within the pre-assembly 10' during operation.

While the above description constitutes the preferred embodiments of the present disclosure, it will be appreciated that the disclosure is susceptible to modification, variation, and change without departing from the proper scope and fair meaning of the accompanying claims.

What is claimed is:

1. A brake caliper (1, 1') for a vehicle brake, the brake caliper (1, 1') comprising:
    a pressure piece (110, 110'),
    a thrust piece (120, 120') configured to move axially relative to the pressure piece (110, 110') in a thrust direction (A) to transmit a braking force, and
    a guiding member (130a,b, 130'a,b), wherein the guiding member (130a,b, 130'a,b) is configured to limit the movement of the thrust piece (120, 120') relative to the pressure piece (110, 110') in at least one direction orthogonal to the thrust direction (A);
    a lever (140) pivotally supported between the thrust piece (120, 120') and the pressure piece (110, 110'), wherein the guiding member (130a,b, 130'a,b) is configured to limit the movement of the lever (140) relative to the pressure piece (110, 110') and/or the thrust piece (120, 120') in at least one direction orthogonal to the thrust direction (A)
    a pivot bearing (150) having a bearing housing (152), wherein the pivot bearing (150) is configured to pivotally support the lever (140) against the thrust piece (120, 120'), and wherein the guiding member (130a,b, 130'a,b) is configured to engage the bearing housing (152) in at least one of a positive fit or in a non-positive fit;
    wherein the guiding member (130'a,b) is integrally formed with the thrust piece (120').

2. The brake caliper (1, 1') of claim 1, wherein the guiding member (130a,b, 130'a,b) and the pressure piece (110, 110') are engaged in at least one of a positive fit or a non-positive fit, to limit the movement of the thrust piece (120, 120') relative to the pressure piece (110, 110') in at least one direction orthogonal to the thrust direction (A).

3. The brake caliper (1, 1') of claim 1, wherein the thrust piece (120, 120') has a first lateral side (126) and a second lateral side (128), and the guiding member (130a,b, 130'a,b) is arranged at the first lateral side (126) of the thrust piece (120, 120').

4. The brake caliper (1, 1') of claim 3, wherein the guiding member (130a, 130'a) is a first guiding member being arranged at the first lateral side (126) and the brake caliper (1, 1') further comprises a second guiding member (130b, 130'b) being arranged at the second lateral side (128) of the thrust piece (120, 120').

5. The brake caliper (1, 1') of claim 4, wherein the second guiding member (130b, 130b') is parallel to the first guiding member (130a, 130'a).

6. The brake caliper (1, 1') of claim 1, wherein the brake caliper (1, 1') further comprises:
    a mounting bracket (180) disposed adjacent to the thrust piece (120, 120') coupling the thrust piece (120, 120') to the brake caliper (1, 1'), and
    at least one spring element (190) disposed between the bracket (180) and the thrust piece (120, 120'),
    wherein the spring element (190) is configured to urge the thrust piece (120, 120') towards the pressure piece (110, 110') in the thrust direction (A).

7. The brake caliper (1, 1') of claim 6, wherein the thrust piece (120, 120') has a number of spring seats (129) that corresponds to the number of spring elements (190), wherein each spring seat is configured to receive and guide the corresponding spring element (190).

8. The brake caliper (1, 1') of claim 1, wherein the pivot bearing (150) is a first pivot bearing (150), the brake caliper (1, 1') further comprising a second pivot bearing (170) having a bearing housing (172), wherein the second pivot bearing (170) is configured to pivotally support the lever (140) against the rolling member (160) and is disposed between the rolling member (160) and the lever (140).

9. The brake caliper of claim 8, wherein a rotation axis of the first pivot bearing (150) is offset relative a rotation axis of the second pivot bearing (170), such that rotation of the lever (140) causes movement of the thrust piece (120, 120') in the thrust direction (A).

10. A brake caliper (1, 1') for a vehicle brake, the brake caliper (1, 1') comprising:
- a pressure piece (110, 110'),
- a thrust piece (120, 120') configured to move axially relative to the pressure piece (110, 110') in a thrust direction (A) to transmit a braking force, and
- a guiding member (130a,b, 130'a,b), wherein the guiding member (130a,b, 130'a,b) is configured to limit the movement of the thrust piece (120, 120') relative to the pressure piece (110, 110') in at least one direction orthogonal to the thrust direction (A)
- a lever (140) pivotally supported between the thrust piece (120, 120') and the pressure piece (110, 110'), wherein the guiding member (130a,b, 130'a,b) is configured to limit the movement of the lever (140) relative to the pressure piece (110, 110') and/or the thrust piece (120, 120') in at least one direction orthogonal to the thrust direction (A);
- a pivot bearing (150) having a bearing housing (152), wherein the pivot bearing (150) is configured to pivotally support the lever (140) against the thrust piece (120, 120'), and wherein the guiding member (130a,b, 130'a,b) is configured to engage the bearing housing (152) in at least one of a positive fit or in a non-positive fit
- a rolling member (160) configured to pivotally support the lever (140) against the pressure piece (110, 110'), and wherein the guiding member (130a,b, 130'a,b) is configured to engage the rolling member (160) in at least one of a positive fit or in a non-positive fit;
- wherein the guiding member (130'a,b) is integrally formed with the thrust piece (120').

11. The brake caliper (1') of claim 10, wherein the guiding member (130'a,b) has a guiding groove (138), the guiding groove (138) being configured to limit the movement of the thrust piece (120') relative to the pressure piece (110') in a first direction orthogonal to the thrust direction (A) and in a second direction orthogonal to the thrust direction (A).

12. The brake caliper (1') of claim 11, wherein the guiding groove (138) is configured to engage at least one of the pressure piece (110'), the pivot bearing (150), the lever (140), or the rolling member (160) in at least one of a positive fit or a non-positive fit.

13. The brake caliper (1, 1') of claim 10, wherein the pivot bearing (150) is a first pivot bearing (150), the brake caliper (1, 1') further comprising a second pivot bearing (170) having a bearing housing (172), wherein the second pivot bearing (170) is configured to pivotally support the lever (140) against the rolling member (160) and is disposed between the rolling member (160) and the lever (140).

14. A method for assembling a brake caliper (1, 1'), the method comprising the steps of:
- preassembling a pressure piece (110, 110'), a thrust piece (120, 120') and a guiding member (130a,b, 130'a,b) to form a preassembly,
- wherein the thrust piece (120, 120') is configured to move axially relative to the pressure piece (110, 110') in a thrust direction (A) to transmit a braking force, and
- wherein the guiding member (130a,b, 130'a,b) is configured to limit the movement of the thrust piece (120, 120') relative to the pressure piece (110, 110') in at least one direction orthogonal to the thrust direction (A);
- pre-assembling a lever (140) to be pivotally supported between the thrust piece (120, 120') and the pressure piece (110, 110'), wherein the guiding member (130a,b, 130'a,b) is configured to limit the movement of the lever (140) relative to the pressure piece (110, 110') and/or the thrust piece (120, 120') in at least one direction orthogonal to the thrust direction (A);
- wherein a pivot bearing (150) having a bearing housing (152) pivotally supports the lever (140) against the thrust piece (120, 120'), and wherein the guiding member (130a,b, 130'a,b) is configured to engage the bearing housing (152) in at least one of a positive fit or in a non-positive fit;
- wherein the guiding member (130'a,b) is integrally formed with the thrust piece (120'); and
- installing the preassembly in the brake caliper (1, 1').

* * * * *